United States Patent
Kondou et al.

(10) Patent No.: US 9,574,659 B2
(45) Date of Patent: Feb. 21, 2017

(54) WORK VEHICLE AND METHOD OF CONTROLLING THE SAME

(71) Applicant: Komatsu Ltd., Tokyo (JP)

(72) Inventors: Shinya Kondou, Hitachinaka (JP); Ryuuen Kou, Hiratsuka (JP)

(73) Assignee: Komatsu Ltd., Tokyo (JP)

( * ) Notice: Subject to any disclaimer, the term of this patent is extended or adjusted under 35 U.S.C. 154(b) by 298 days.

(21) Appl. No.: 14/238,912

(22) PCT Filed: Jul. 12, 2013

(86) PCT No.: PCT/JP2013/069187
§ 371 (c)(1),
(2) Date: Feb. 14, 2014

(87) PCT Pub. No.: WO2015/004808
PCT Pub. Date: Jan. 15, 2015

(65) Prior Publication Data
US 2016/0208914 A1 Jul. 21, 2016

(51) Int. Cl.
*F16H 61/16* (2006.01)
*F16H 61/10* (2006.01)
*F16H 61/18* (2006.01)
F16H 61/21 (2006.01)
E02F 9/20 (2006.01)

(52) U.S. Cl.
CPC .............. *F16H 61/16* (2013.01); *F16H 61/10* (2013.01); *F16H 61/18* (2013.01); *E02F 9/2079* (2013.01); *F16H 61/21* (2013.01); *F16H 2061/163* (2013.01); *F16H 2306/20* (2013.01)

(58) Field of Classification Search
None
See application file for complete search history.

(56) References Cited

U.S. PATENT DOCUMENTS

| 5,846,161 A | 12/1998 | Hosseini et al. |
|---|---|---|
| 6,188,950 B1 | 2/2001 | Tsutsumi et al. |
| 6,405,120 B1 | 6/2002 | Higashimata et al. |

(Continued)

FOREIGN PATENT DOCUMENTS

| CN | 101421546 A | 4/2009 |
|---|---|---|
| CN | 102483150 A | 5/2012 |

(Continued)

OTHER PUBLICATIONS

International Search Report dated Aug. 13, 2013, issued for PCT/JP2013/069187.

*Primary Examiner* — Edwin A Young
(74) *Attorney, Agent, or Firm* — Locke Lord LLP (57) ABSTRACT

A work vehicle including a transmission that transmits power of an engine to wheels at a plurality of different transmission gear ratios, the work vehicle traveling while maintaining a targeted speed by controlling a degree of opening of an accelerator, brakes, and the transmission, wherein the work vehicle includes a controller which inhibits change in the transmission gear ratio of the transmission when the transmission shifts up before lapse of a first predetermined time after the transmission shifts down while the vehicle is running downhill and then before a second predetermined time elapses, the transmission shifts down while the vehicle is running downhill.

16 Claims, 7 Drawing Sheets

(56) References Cited

U.S. PATENT DOCUMENTS

| | | |
|---|---|---|
| 8,165,763 B2 | 4/2012 | Wolfgang et al. |
| 8,744,703 B2 | 6/2014 | Swartling et al. |
| 2002/0006850 A1* | 1/2002 | Takao .................... B60K 31/04 477/118 |
| 2002/0013650 A1* | 1/2002 | Kusafuka ............ F16H 61/0213 701/51 |
| 2002/0058568 A1* | 5/2002 | Ishiguro ................ B60W 10/06 477/115 |
| 2009/0265067 A1 | 10/2009 | Wolfgang et al. |
| 2010/0204007 A1* | 8/2010 | Winkel ................... F16H 61/16 477/34 |
| 2012/0166054 A1 | 6/2012 | Swartling et al. |

FOREIGN PATENT DOCUMENTS

| | | |
|---|---|---|
| JP | 08-193654 A | 7/1996 |
| JP | 10-059015 A | 3/1998 |
| JP | 10-169766 A | 6/1998 |
| JP | 11-151952 A | 6/1999 |
| JP | 2000-326761 A | 11/2000 |
| JP | 2001-099307 A | 4/2001 |
| WO | WO-2007/118783 A1 | 10/2007 |
| WO | WO-2011/031219 A1 | 3/2011 |

\* cited by examiner

Mup

|  | Map | Mbk |
|---|---|---|
| F1→F2 | Na | Ng |
| F2→F3 | Nb | Nh |
| F3→F4 | Nc | Ni |
| F4→F5 | Nd | Nj |
| F5→F6 | Ne | Nk |
| F6→F7 | Nf | Nl |

FIG.6

Mdn

|  | Map | Mbk |
|---|---|---|
| F7→F6 | Nm | Ns |
| F6→F5 | Nn | Nt |
| F5→F4 | No | Nu |
| F4→F3 | Np | Nv |
| F3→F2 | Nq | Nw |
| F2→F1 | Nr | Nx |

FIG.8

WORK VEHICLE AND METHOD OF CONTROLLING THE SAME

FIELD

This invention relates to a work vehicle and a method of controlling the work vehicle.

BACKGROUND

Work vehicles, such as hydraulic shovels and dump trucks, include those having a multistage transmission having a plurality of transmission gear ratios capable of changing to a different transmission gear ratio, and in which power of an engine is transmitted to wheels. There is a technology (for example, Patent Literature 1) in which, while a work vehicle provided with a multistage transmission is traveling, after an upshift is performed, when a downshift is performed with a predetermined time, the transmission is inhibited from changing transmission gears.

CITATION LIST

Patent Literature

Patent Literature 1: Japanese Patent Application Laid-open No. 10-169766

SUMMARY

Technical Problem

When a work vehicle provided with a multistage transmission is controlled to run downhill at a constant speed, there is a possibility that an upshift and a downshift may automatically be repeated.

It is an object of this invention to reduce a frequency at which an upshift and downshift of a transmission are repeated while a work vehicle provided with a multistage transmission that automatically changes transmission gears is running downhill.

Solution to Problem

The present invention is a work vehicle including a transmission that transmits power of an engine to wheels at a plurality of different transmission gear ratios, the work vehicle traveling while maintaining a targeted speed by controlling a degree of opening of an accelerator, brakes, and the transmission, wherein the work vehicle includes a controller which inhibits change in the transmission gear ratio of the transmission when the transmission shifts up before lapse of a first predetermined time after the transmission shifts down while the vehicle is running downhill and then before a second predetermined time elapses, the transmission shifts down while the vehicle is running downhill.

In the present invention, it is preferable that the controller determines that the vehicle is running downhill when the controller detects that in a case where the degree of opening of the accelerator is less than a predetermined degree of opening, an acceleration of the vehicle is greater than 0 and a speed of the vehicle after lapse of a predetermined time exceeds a maximum value in the predetermined time.

In the present invention, it is preferable that the controller inhibits the change in the transmission gear ratio of the transmission when the transmission shifts up before lapse of the first predetermined time after the transmission shifts down in a state in which the brakes are operated while the vehicle is running downhill and then before the second predetermined time elapses, the transmission shifts down in a state in which the brakes are operated while the vehicle is running downhill.

In the present invention, it is preferable that the controller inhibits the change in the transmission gear ratio of the transmission when the transmission shifts up before lapse of the first predetermined time after the transmission shifts down in a state in which the degree of opening of the accelerator is less than the predetermined degree of opening while the vehicle is running downhill and then before the second predetermined time elapses, the transmission shifts down in a state in which the degree of opening of the accelerator is less than the predetermined degree of opening while the vehicle is running downhill.

In the present invention, it is preferable that the controller cancels the inhibition of the change in the transmission gear ratio when a command value for a speed targeted by the vehicle is changed to a predetermined magnitude or greater.

In the present invention, it is preferable that the work vehicle, further includes an inclination detecting device that detects an inclination of a road surface on which the vehicle travels, wherein, when the inclination changes by a predetermined value or greater, the controller cancels the inhibition of the change in the transmission gear ratio.

In the present invention, it is preferable that when a time in which the degree of opening of the accelerator is greater than a predetermined magnitude continues for a predetermined time, the controller cancels the inhibition of transmission gear ratio.

In the present invention, it is preferable that when a rotation speed of the engine increases greater than a predetermined magnitude, the controller cancels the inhibition of transmission gear ratio.

The present invention is a method of controlling a work vehicle, in the case of controlling a work vehicle that includes a transmission which transmits power of an engine to wheels at a plurality of different transmission gear ratios and that travels while maintaining a targeted speed by controlling a degree of opening of an accelerator, brakes, and the transmission, the method comprising: determining whether or not a first condition is satisfied, the first condition being that the transmission shifts down while the vehicle is running downhill; determining whether or not a second condition is satisfied, the second condition being that after the first condition is satisfied, the transmission shifts up before lapse of a first predetermined condition; determining whether or not a third condition is satisfied, the third condition being that after the second condition is satisfied before lapse of a second predetermined time, the transmission shifts down while the vehicle is running downhill; and when all of the first condition, the second condition, and the third condition all is satisfied, inhibiting change in the transmission gear ratio of the transmission.

In the present invention, it is preferable that the vehicle is determined to be running downhill when in a case where the degree of opening of the accelerator is less than a predetermined degree of opening, an acceleration of the vehicle is greater than 0 and a speed of the vehicle after lapse of a predetermined time exceeds a maximum value in the predetermined time.

In the present invention, it is referable that further when the brakes are operated, the first condition and the third condition are satisfied.

In the present invention, it is preferable that further when the degree of opening of the accelerator is less than a predetermined degree of opening, the first condition and the third condition are satisfied.

In the present invention, it is preferable that when the inclination changes by a predetermined value or greater, the inhibition of the change in the transmission gear ratio is canceled.

In the present invention, it is preferable that when a command value for a speed targeted by the vehicle is changed to a predetermined magnitude or greater, the inhibition of the change in the transmission gear ratio is canceled.

In the present invention, it is preferable that when a time in which the degree of opening of the accelerator is greater than a predetermined magnitude continues for a predetermined time, the inhibition of the change in the transmission gear ratio is canceled.

In the present invention, it is preferable that when a rotation speed of the engine increases by a predetermined magnitude or greater, the inhibition of the change in the transmission gear ratio is canceled.

Advantageous Effects of Invention

This invention can reduce a frequency at which a downshift and upshift of a transmission are repeated while a work vehicle provided with the transmission, which is multistage and automatically changes transmission gears, running downhill.

DESCRIPTION OF EMBODIMENTS

A mode (embodiment) for practicing this invention will be described in detail with reference to the drawings.

Figure 1:
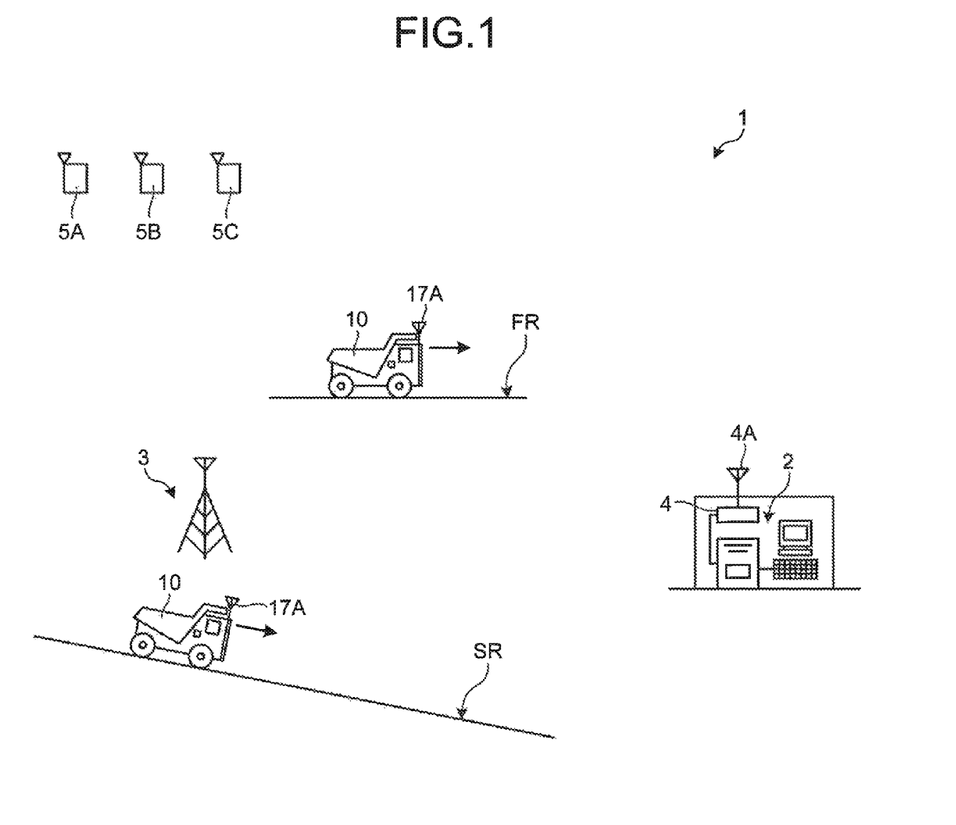
FIG. 1 is a diagram illustrating a field site in which a work vehicle according to this embodiment operates.

FIG. 1 is a diagram illustrating a field site in which a work vehicle according to this embodiment operates. Although the work vehicle according to this embodiment is used for various operations in a mine, it is not limited to work vehicles used in mines. In this embodiment, a dump truck 10, as a transporter vehicle that transports earth and sand or rock, etc., produced when crushing stones or digging crushed stones, serves as an example of the work vehicle. However, the work vehicle is not limited to the dump truck 10. For example, the work vehicle according to this embodiment may be a sprinkler truck that sprinkles water onto a road surface, or the like.

<Dump Truck in Mine>

In this embodiment, the dump truck 10 is controlled by an AHS (Autonomous Haulage System) 1 to automatically travel. Specifically, the AHS 1 controls the degree of opening of an accelerator, a brake, and a transmission, whereby the dump truck 10 travels while maintaining a targeted speed. In the AHS 1, a driving managing device 2 controls the dump truck 10 to automatically travel via radio communication. The driving managing device 2 is a type of a managing device that is installed in an object different from the dump truck 10, which is a mobile body, for example, in a management facility for a mine, and that manages: work vehicles including the dump truck 10; operations in the mine; etc.

The driving managing device 2 is connected to a radio communication device 4 including an antenna 4A in order to cause the dump truck 10, which operates in the mine, to travel. The dump truck 10 includes an antenna 17A for receiving commands from the driving managing device 2 and transmitting information on operation of the dump truck 10 to the driving managing device 2. In addition, the dump truck 10 is able to position its location by receiving, with a GPS (Global Positioning System) antenna 18A, radio waves from GPS satellites 5A, 5B, and 5C.

The output of radio waves that are transmitted from the antenna 4A of the driving managing device 2 and the antenna 17A of the dump truck 10 does not have such a range capable of communication as to cover the entire area of the mine. Accordingly, the AHS 1 includes a repeater 3 that repeats the radio waves that are transmitted by the antenna 4A and the antenna 17A. The repeater 3 makes it possible for the driving managing device 2 to transmit control commands to the dump truck 10, which operates at a location away from the repeater 3 and to collect, from the dump truck 10, operation information thereon.

In the mine, when the dump truck 10 travels between an earth discharging field and a loading field, the dump tuck 10 travels on a flat road FR and on a slope road SR. In the example illustrated in FIG. 1, the dump truck 10, which is traveling on the slope road SR, is traveling down on the slope road SR. Next, the dump truck 10 will be described.

<Dump Truck 10>

Figure 2:
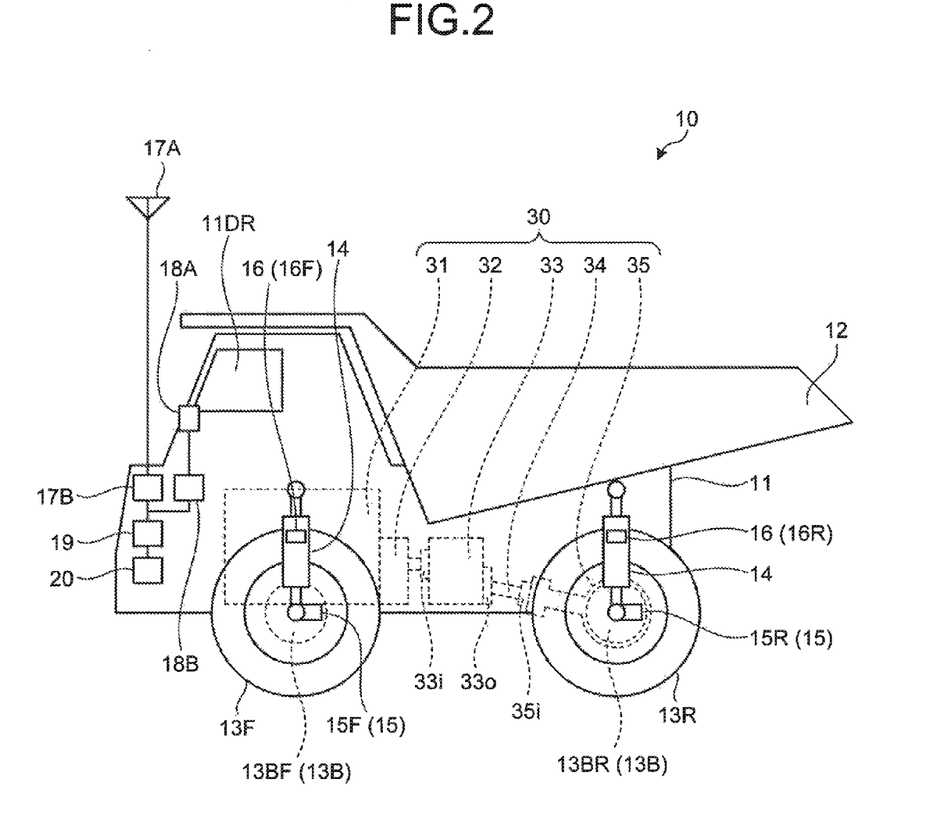
FIG. 2 is a diagram illustrating a dump truck according to this embodiment.

FIG. 2 is a diagram illustrating the dump truck according to this embodiment. The dump truck 10 is automatically controlled by the AHS 1 without being operated by an operator. In a case where the dump truck 10 is carried into a maintenance factory, and in a case where the dump truck 10 is carried out of the maintenance factory, control of the dump truck 10 by the AHS 1 may not be executed. In this case, the operator needs to get aboard on the dump truck 10 to operate the dump truck 10. Accordingly, the dump truck 10 is provided with a driver's seat 11DR on which the operator is aboard, and the driver's seat 11DR includes operation devices such as a steering wheel, an accelerator pedal, and a brake pedal.

The dump truck 10 carries a cargo, and discharges the cargo at a desired place. The dump truck 10 includes a vehicle body 11, a vessel 12, front wheels 13F, rear wheels 13R, brakes 13B, suspension cylinders 14, rotation sensors 15, suspension pressure sensors (pressure sensors) 16, an in-vehicle radio communication device 17B connected to the antenna 17A, a GPS receiver 18B as a position information detector to which the GPS antenna 18A is connected, a communication control device 19, a controller 20, and a driving device 30. Note that the dump truck 10 has various types of mechanisms and functions provided in a general transporter or transporting vehicle other than the above devices. Although this embodiment exhibits the dump truck 10, which is of a rigid type, performs steering with the front wheels 13F, this embodiment is applicable also to an articulated type dump truck in which, instead of the dump truck 10, the vehicle body is divided into a front part and a rear part and the parts are jointed by free joints.

The vehicle body 11 is provided with the vessel 12, the front wheels 13F, the rear wheels 13R, the suspension cylinders 14, the driving device 30, etc. The vessel 12 functions as a pallet for loading a cargo such as minerals, earth and sand. The vessel 12 is disposed on an upper part of the vehicle body 11. The front wheels 13F are steering, wheels for determining a moving direction. The rear wheels 13R are drive wheels for causing the dump truck 10 to travel. The front wheels 13F are disposed in a front part of the vehicle body 11, that is, on right and left sides of the driver's cabin 11DR. The rear wheels 13R are disposed in a rear part of the vehicle body 11, that is, on right and left sides opposite to the driver's cabin 11DR.

The brakes 13B include front wheel brakes 13BF and rear wheel brakes 13BR. The front wheel brakes 13B are respectively provided to the front wheels 13F to brake the front wheels 13F. The rear wheel brakes 13BR are respectively provided to the rear wheels 13R to brake the rear wheels 13R.

The suspension cylinders 14 are provided between the vehicle body 11, and the right and left front wheels 13F and the right and left rear wheels 13R. The suspension cylinders 14 are respectively attached to support the right and left front wheels 13F and the right and left rear wheels 13R. A load according to the mass of a cargo when the cargo is loaded in addition to a load of the vehicle body 11 and the vessel 12 acts on the suspension cylinders 14. The suspension cylinders 14 have operating oil encapsulated therein, and operates to elongate and contract in accordance with the mass of the cargo.

The rotation sensors 15 include front wheel rotation sensors 15F that respectively detect the numbers of rotations of the front wheels 13F, and rear wheel rotation sensors 15R that respectively detect the numbers of rotations of the rear wheels 13R. The rotation sensors 15 measure a speed (referred to as a vehicle speed, if required) at which the dump truck 10 travels in such a manner that, for example, the front wheel rotation sensors 15F detect a rotation speed of the front wheels 13F. Regarding the front wheels 13F, slipping on a road surface hardly occurs because the front wheels 13F are not driven by the driving device 30. Thus, the rotation speed of the front wheels 13F approximately correspond to the vehicle speed of the dump truck 10.

The suspension pressure sensors 16 are respectively provided correspondingly to the suspension cylinders 14, which are attached to the front wheels 13F and the rear wheels 13R. The suspension pressure sensors 16 detect loads respectively acting on the suspension cylinders 14. Specifically, the suspension pressure sensors 16 can measure the mass (loading amount) of the cargo by detecting the pressure of the operating oil encapsulated in the suspension cylinders 14.

The antenna 17A receives radio waves output from the repeater 3 of the driving managing device 2 illustrated in FIG. 1. The antenna 17A outputs the received radio waves to the in-vehicle radio communication device 17B. The in-vehicle radio communication device 17B performs radio communication via the antenna 17A, the repeater 3, and the antenna 4A of the driving managing device 2.

The GPS antenna 18A receives radio waves output from the plurality of GPS satellites 5A, 5B, and 5C (see FIG. 1) that configure the GPS (Global Positioning System). The GPS antenna 18A outputs the received radio waves to the GPS receiver 18B. The GPS receiver 18B converts the radio waves received by the GPS antenna 18A into an electric signal, and calculates position information (performs positioning) on the GPS receiver 18B, that is, position information on the dump truck 10.

The in-vehicle radio communication device 17B and the GPS receiver 18B are connected to the communication control device 19. The communication control device 19 is connected to the controller 20. The communication control device 19 converts information from the in-vehicle radio communication device 17B and the GPS receiver 18B into a format capable of being understood by the controller 20. This structure causes the controller 20 to acquire information for unmanned driving of the dump truck 10 from the driving managing device 2 via the communication control device 19, the in-vehicle radio communication device 17B and the antenna 17B. Also, the controller 20 acquires position information on the dump truck 10 from the GPS receiver 183.

(Driving Device 30)

The driving device 30 drives the rear wheels 13R to causes the dump truck 10 to travel. The driving device 30 includes an engine 31 as a power generator, a torque converter 32, a transmission 33, a propeller shaft 34, and a differential gear 35. The engine 31 is a diesel engine in this embodiment, but is not limited thereto. An output of the engine 31 is transmitted to the transmission 33 via the torque converter 32. The transmission 33 reduces the rotation speed (the number of rotations per unit time) of a crank shaft as an output shaft of the engine 31 to increase torque, and outputs the increased torque to the propeller shaft 34.

The propeller shaft 34 joins an output portion 33o of the transmission 33 and an input portion 35i of the differential gear 35 to each other. The differential gear 35 transmits the transmitted output from the transmission 33 to drive the right and left rear wheels 13R. In this manner, the driving device 30 causes the dump truck 10 to travel.

(Transmission 33)

The transmission 33 can cause the rotation speed of the engine 31, which is input from an input portion 33i, to differ, that is, can change speeds, and can output the changed speed from the output portion 33o. When the rotation speed at the input portion 33i of the transmission 33 is represented by NI, and the rotation speed at the output portion 33o is represented by NO, a transmission gear ratio $\rho$ is represented by expression (1):

$$\rho = NI/NO \qquad (1)$$

In this embodiment, the transmission 33 is, for example, a power transmitting device in which a plurality of planetary gear mechanisms for transmitting power from the engine 31, a plurality of clutches for selecting rotating elements provided in the respective planetary gear mechanisms, and a plurality of brakes are combined. The transmission 33 can realize a plurality of different transmission gear ratios by engaging or releasing the clutches and the brakes, and switching rotating elements though which the power of the engine 31 basses. In this embodiment, the transmission 33 can change the transmission gear ratio $\rho$ in seven stages. In this case, it is said that the transmission 33 has seven stages of transmission gears. The number of stages of transmission gears provided in the transmission 33 is not limited to seven.

In a case where the rotation speed of the engine 31, that is, the rotation speed NI at the input portion 33i of the transmission 33, is identical, as the transmission gear ratio ρ is less, the rotation speed NO at the output portion 33o of the transmission 33 is greater. In a case where the transmission 33 has n stages (n is an integer equal to 1 or greater) of transmission gears, the transmission 33 has stages called the first stage, the second stage . . . the n-th stage in descending order in which the transmission gear ratio ρ increases. In this embodiment, switching of the transmission gear ratio ρ from a large transmission gear stage to a small transmission gear stage is called an upshift, while switching of the transmission gear ratio from a small transmission gear ratio to a large transmission gear ratio is called a downshift.

In this embodiment, although the transmission 33 can realize the transmission gear ratio ρ, which corresponds to each transmission gear stage, it cannot realize the transmission gear ratio ρ, which is present between transmission gear stages. The number of transmission gear ratios ρ capable of being realized by the transmission 33 is finite. Thus, in the transmission 33, the transmission gear ratio ρ should change in stages. The above-described transmission 33 is called the staged transmission. A crank shaft of the engine 31 is linked to the input portion 33i of the transmission 33 via the torque converter 32. This structure causes the transmission 33 to transmit the engine power to the wheels 13, more specifically, to the rear wheels 13R, at the plurality of different transmission gear ratios.

The transmission 33 is controlled by the controller 20 to automatically change transmission gear stages. As described above, the transmission 33 is a staged automatic transmission. In addition, an operator of the dump truck 10 operates a shift selector provided in the driver's cabin 11DR to designate a transmission gear stage, whereby the transmission 33 can fix the transmission gear stage to the designated transmission gear stage and can also perform inhibition (shift holding) of changing the transmission gear stage to transmission gear stages other than the designated transmission gear stage.

<Controller 20>

Figure 3:
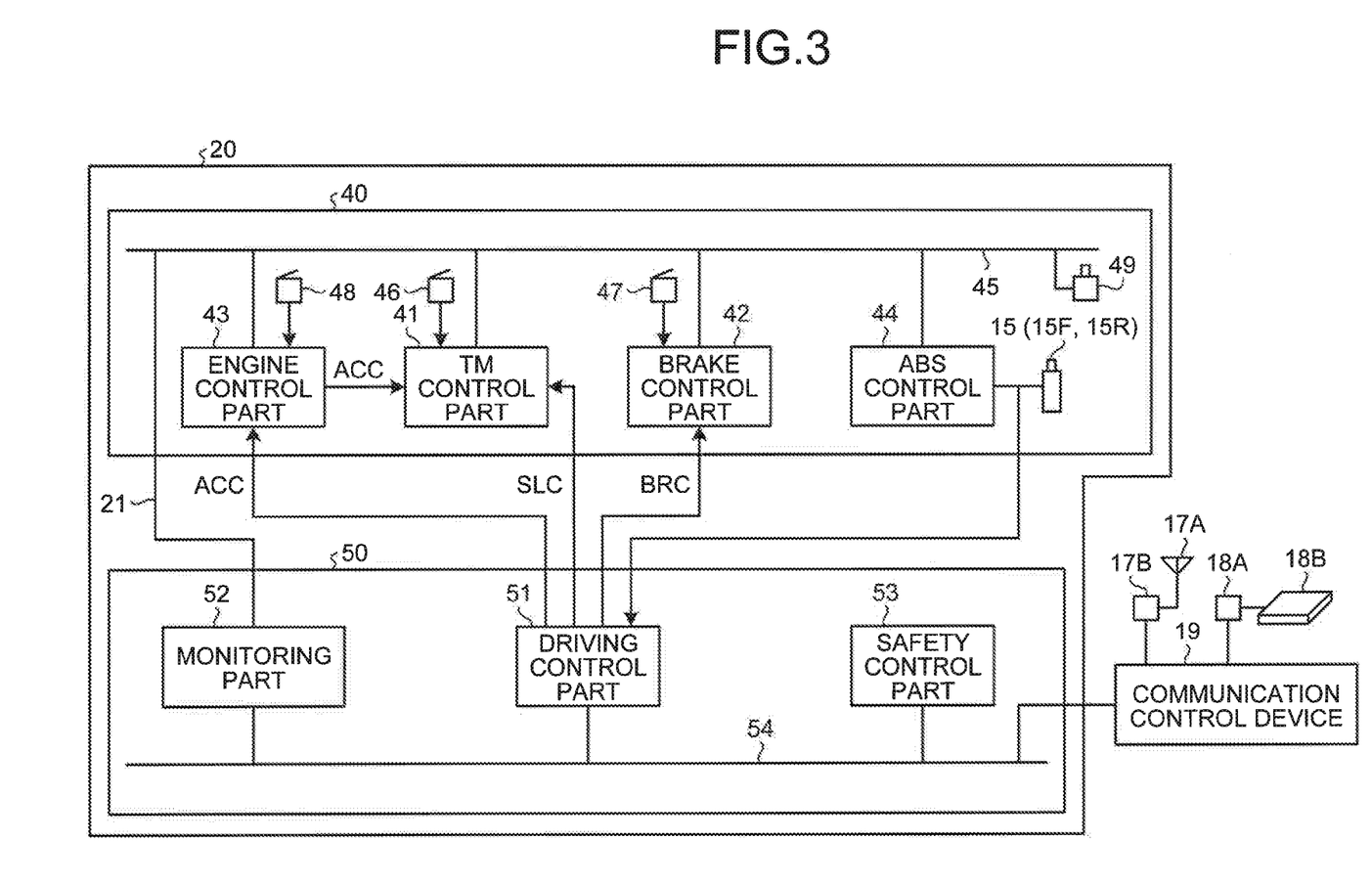
FIG. 3 is a block diagram illustrating a controller included in the dump truck.

FIG. 3 is a block diagram illustrating the control device provided in the dump truck. The controller 20 includes a first control unit 40 and a second control unit 50. The first control unit 40 is a controller that controls devices provided in the dump truck 10, such as the transmission 33 and the brakes 13B. The second control unit 50 is a controller for causing the dump truck 10 to automatically travel in an unmanned manner on the basis of a command from the driving managing device 2 illustrated in FIG. 1.

(First Control Unit 40)

The first control unit 40 includes a TM (Trans Mission) control part 41, a brake control part 42, an engine control part 43, and an ABS (Antilock Brake System) control part 44. The TM control part 41, the brake control part 42, the engine control part 43, and the ABS control part 44 are computers each provided with, for example, a processing part including a CPU (Central Processing Unit) and a storage part including a ROM (Read Only Memory).

The TM control part 41 controls the transmission 33 and the torque converter 32, which are illustrated in FIG. 2. The brake control part 42 controls the brakes 13B illustrated in FIG. 2. The engine control part 43 controls the engine 31 illustrated in FIG. 2. The ABS control part 44 releases the locking of the wheels 13 by reducing braking force of the brakes 13B in a case where the wheels 13 are locked when the wheels 13 are braked by the brakes 13B illustrated in FIG. 2.

The TM control part 41, the brake control part 42, the engine control part 43, and the ABS control part 44 each store, in each storage, a computer program for realizing each function. In the TM control part 41, the brake control part 42, the engine control part 43, and the ABS control part 44, each processor controls the devices provided in the dump truck 10 by reading the computer program, which is necessary for control, from each storage, and executing commands described in this computer program.

A shift selector 46 is connected to the TM control part 41. The shift selector 46 designates a transmission gear stage of the transmission 33 illustrated in FIG. 2, and designates a speed change mode when the transmission 33 performs automatic speed change. A brake sensor 47 is connected to the brake control part 42. The brake sensor 47 detects an operation amount of a retarder lever and a brake pedal which are provided in the driver's cabin 11DR of the dump truck 10. The brake control part 42 controls the brakes 13B of the dump truck 10 on the basis of a detection value of the brake sensor 47.

An accelerator position detecting sensor 48 is connected to the engine control part 43. The accelerator position detecting sensor 48 detects an operation amount of the accelerator pedal provided in the driver's cabin 11DR of the dump truck 10. The engine control part 43 controls the engine 31 of the dump truck 10 on the basis of a detection value of the accelerator position detecting sensor 48. The rotation sensors 15 (the front wheel rotation sensors 15F and the rear wheel rotation sensors 15R) are connected to the ABS control part 44. The ABS control part 44 adjusts the braking force of the brakes 13B on the basis of detection values of the rotation sensors 15.

As illustrated in FIG. 3, the TM control part 41, the brake control part 42, the engine control part 43, and the ABS control part 44 are electrically connected to one another by a communication line 45. In addition, an inclination detecting device 49 that detects the inclination of the road surface on which the dump truck 10 travels is electrically connected to the communication line. For example, an inclination angle sensor is used as the inclination detecting device 49. This structure enables them to mutually exchange information. For example, the TM control part 41, the brake control part 42, the engine control part 43, and the ABS control part 44 can acquire information from other controllers or detection values from sensors, etc., which are connected to other controllers, via the communication line 45, and can use the information or the detection values for their control.

(Second Control Unit 50)

The second control unit 50 includes a driving control part 51, a monitoring part 52, and a safety control part 53. The driving control part 51, the monitoring part 52, and the safety control part 53 are, for example, computers each provided with a processor including a CPU (Central Processing Unit) and a storage including a ROM (Read Only Memory).

The driving control part 51 controls the dump truck 10 through the first control unit 40 on the basis of information for driving the dump truck 10 in an unmanned manner, acquired from the driving managing device 2 via the communication control device 19. The monitoring part 52 is connected to the communication line 45 of the first control unit 40 by a communication line 21. The monitoring part 52 monitors the status of the first control unit 40 and acquires various types of information from the first control unit 40 via the communication line 21. The safety control part 53 controls head lamps, indicators, a horn, an engine starter, a parking brake, etc. of the dump truck 10.

The driving control part 51, the monitoring part 52, and the safety control part 53 store, in their storages, computer programs for realizing their functions. In the driving control part 51 the monitoring part 52, and the safety control part 53, their processors control the dump truck 10 by reading computer programs necessary for control from their storages, and executing commands described in the computer programs.

The driving control part 51, the monitoring part 52, and the safety control part 53 are electrically connected to one another by a communication line 54. This structure enables them to mutually exchange information. For example, the driving control part 51, the monitoring part 52, and the safety control part 53 can acquire information from other controllers or detection values form sensors, etc., connected to other controllers, via the communication line, and can use the information or the detection values for their control. The communication line 54 is connected to the communication control device 19. The driving control part 51 acquires information, for driving the dump truck 10 in an unmanned manner, transmitted by the driving managing device 2 illustrated in FIG. 1. Also, the second control unit 50 transmits information related to the status of the dump truck 10, which is being automatically driven in an unmanned manner, to the driving managing device 2 via the communication line 54 and the communication control device 19.

The driving control part 51 transmits a shift control command SLC to the TM control part 41, and transmits an accelerator control command ACC to the engine control part 43. The TM control part 41 acquires the accelerator control command ACC via the engine control part 43. In addition, the driving control part 51 transmits a brake command BRC to the brake control part 42 of the first control unit 40. The driving control part 51 generates at least one of the accelerator control command ACC, the shift control command SLC, and the brake command BRC on the basis of information, for driving the dump truck 10 in an unmanned manner, acquired from the driving managing device 2. In addition, the driving control part 51 controls the dump truck 10 via the first control unit 40 with at least one of the accelerator control command ACC, the shift control command SLC, and the brake command BRC.

Figure 4:
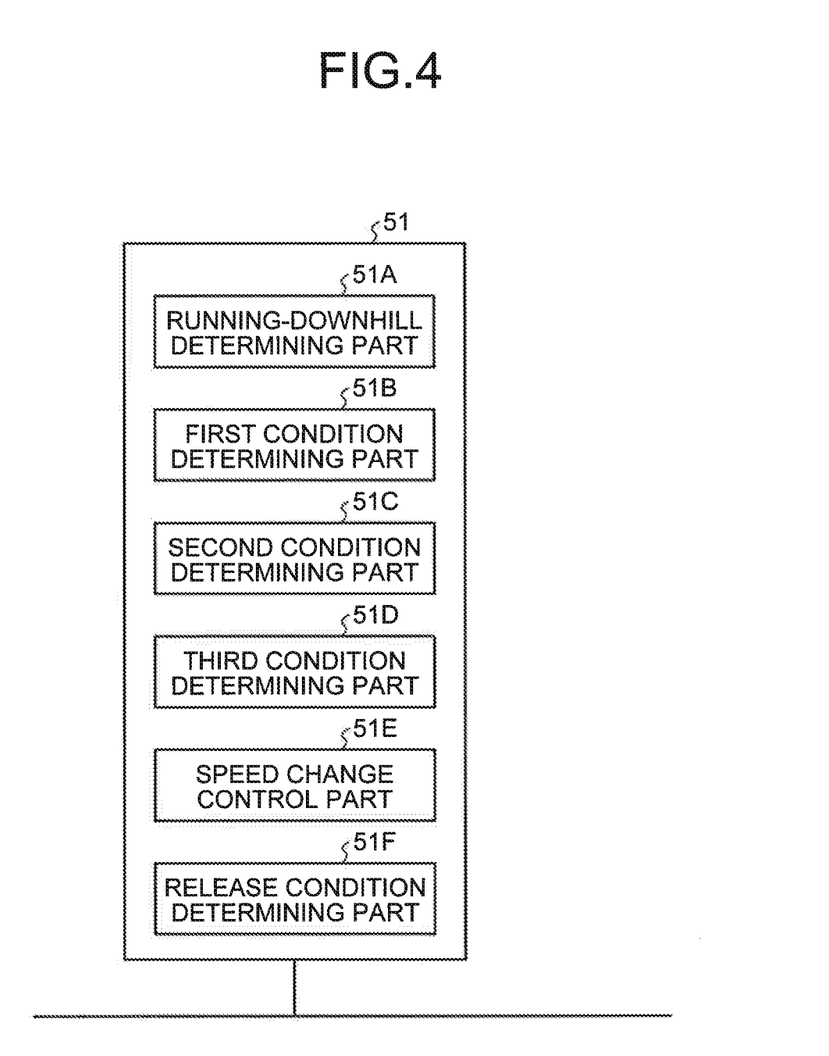
FIG. 4 is a block diagram illustrating a driving control part.

FIG. 4 is a block diagram illustrating the driving control part. The driving control part 51 includes a running-downhill determining part 51A, a first condition determining part 51B, a second condition determining part 51C, a third condition determining part 51D, a speed change control part 51E, and a release condition determining part 51F. The running-downhill determining part 51A determines whether or not the dump truck 10 as a vehicle is going down on a slope, that is, whether or not it is running downhill. The first condition determining part 51B determines whether or not the transmission 33 has shifted down while the dump truck 10 is running downhill. In this embodiment, it is a first condition that the transmission 33 has shifted down while the dump truck 10 is running downhill.

After the first condition satisfied, before lapse of a first predetermined time, the second condition determining part 51C determines whether or not the transmission 33 has shifted up. In this embodiment, it is a second condition that the transmission 33 has shifted up before lapse of the first predetermined time after the first condition satisfied. After the second condition satisfied, before lapse of a second predetermined time, the third condition determining part 51D determines whether or not the transmission 33 has shifted down while the dump truck is running down. When the first condition, the second condition, and a third condition have been satisfied, the speed change control part 51E inhibits change in transmission gear ratio of the transmission 33. After the change in the transmission gear ratio is inhibited, the release condition determining part 51F determines a condition that releases the inhibition.

<Regarding Change in Shift Stage>

Figure 5:
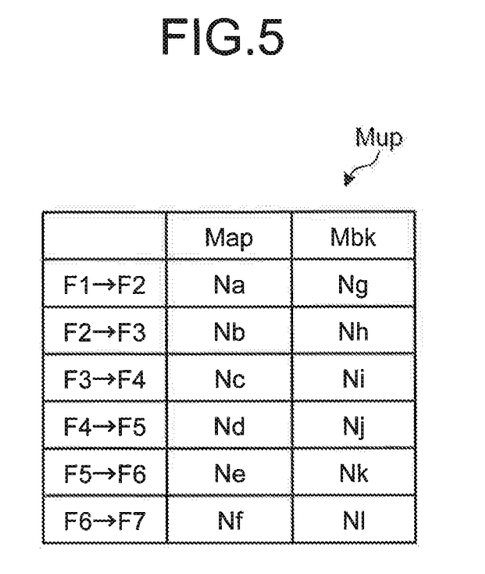
FIG. 5 is a speed change control map illustrating one example of conditions for a transmission to change shifting stages.
Figure 6:
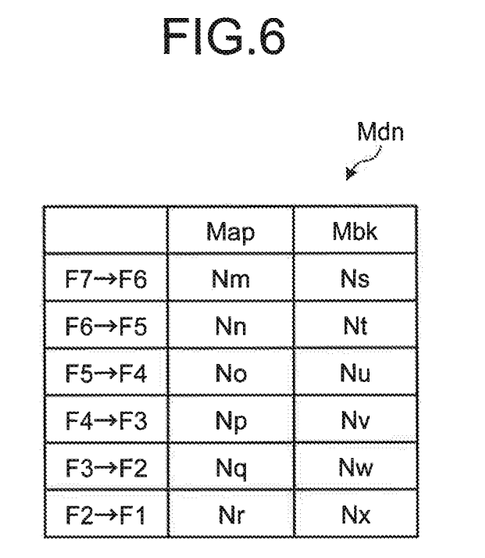
FIG. 6 is a speed change control map illustrating one example of conditions for a transmission to change shifting stages.

FIG. 5 and FIG. 6 are charts of speed change control maps illustrating each example of conditions that the transmission changes shift stages. FIG. 5 illustrates one example of a speed change control map Mup for use in shifting up by the transmission 33, and FIG. 6 illustrates one example of a speed change control map Mdn for use in shifting down by the transmission 33. The speed change control maps Mup and Mdn describe rotation speeds by speed change mode when the transmission 33 shifts up or shifts down. The transmission 33 illustrated in FIG. 2 automatically shifts up or shifts down in accordance with the speed change control maps Mup and Mdn.

The transmission 33 changes timing of shifting up or shifting down depending on driving conditions of the dump truck 10, such as a load on the dump truck 10, the degree of opening of the accelerator, braking or no braking, priority on fuel consumption or on output. The speed change modes are timings of shifting up or shifting down corresponding to individual driving conditions of the dump truck 10. In FIG. 5 and FIG. 6, typical speed change modes Map and Mbk are illustrated.

Map and Mbk in FIG. 5 and FIG. 6 are one example of speed change modes. The speed change mode Map indicates a rotation speed when the transmission 33 shifts up or shifts down in a case where the degree of opening of the accelerator has a certain amount less than its full degree of opening. The speed change mode Mbk indicates a rotation speed when the transmission 33 shifts up or shifts down in a case where the brakes 13B of the dump truck 10 operates to generate a braking force. In this embodiment, the rotation speed when the transmission 33 shifts up or shifts down is the rotation speed of the propeller shaft 34 illustrated in FIG. 2, that is, the rotation speed of the output portion 33o of the transmission 33, but is not limited thereto.

F1→F2 in the speed change control map Mup indicates that the transmission gear stage of the transmission 33 shifts up from the first stage to the second stage. The example of F1→F2 applies also to F2→F3, F3→F4, etc. F7→F6 the speed change control map Mdn indicates that the transmission gear stage of the transmission 33 shifts down from the seventh stage to the sixth stage. The example of F7→F6 applies also to F6→F5, F5→F4, etc.

Rotation speeds Na, Nb, No, Nd, Ne, and Nf, and rotation speeds Ng, Nh, Ni, Nj, Nk, and Nl, in the speed change control map Mup increase in this order (Na<Nb<No<Nd<Ne<Nf<Ng<Nh<Ni<Nj<Nk<Nl). Rotation speeds Nm, Nn, No, Np, Ng, and Nr, and rotation speeds Ns, Nt, Nu, Nv, Nw, and Nx, in the speed change control map Mdn, increase in this order (Nm<Nn<No<Np<Ng< and Nr<Ns<Nt<Nu<Nv<Nw<Nx).

<Operation of the Dump Truck 10 During Automatic Driving>

As described above, when the dump truck 10, which is provided with the staged transmission 33, is automatically driven by, for example, the AHS 1 illustrated in FIG. 1, the transmission 33 automatically shifts up or shifts down in accordance with the speed change mode. As described above, while the dump truck 10 is running down on a slope during automatic driving, there is a possibility that the transmission 33 may automatically shift up and shift down repeatedly. When the transmission 33 repeatedly shifts up and shifts down, there are possibilities that a behavior of the dump truck 10 may become unstable and that durability of the transmission 33 may decrease. Next, a cause for the fact that the dump truck 10, which is provided with the transmission 33 capable of automatically changing speeds, repeatedly shifts up and shifts down while running downhill, will be described.

The dump truck 10, which is being automatically driven, is controlled to travel at a targeted predetermined vehicle speed instructed by the driving managing device 2. For example, it is assumed that the dump truck. 10 traveled at a constant vehicle speed V1 by a command of the driving managing device 2 illustrated in FIG. 1. It is assumed that, at this time, the transmission gear stage of the transmission 33 were F4 (the fourth speed). It is assumed that, in this state, the dump truck 10 went down on a slope. Then, (1) Since the vehicle speed increases, in the dump truck 10, the driving control part 51 of the second control unit 50 turns off the accelerator and operates the brakes 133, thereby executing automatic control that brakes the dump truck 10. At this time, the rotation speed that shifts down the transmission gear stage of the transmission 33 from F4 to F3 (the third speed) is a rotation speed Nv from the speed change mode Mbk in the speed change control map Mdn illustrated in FIG. 6.

(2) The dump truck 10 is braked under automatic control, whereby the vehicle speed of the dump truck 10 decreases. Along with the decrease in the vehicle speed of the dump truck 10, when the rotation speed at the output portion 33o of the transmission 33 decreases below the rotation speed Nv, the transmission 33 automatically shifts down from F4 to F3.

(3) The downshift causes the braking force by an engine brake to act on the dump truck 10, so that the vehicle speed of the dump truck 10 decreases. Accordingly, the driving control part 51 executes automatic control that cancels braking by the brakes 13B and that increases the degree of opening of the accelerator. This automatic control increases the vehicle speed of the dump truck 10. At this time, the rotation speed that causes the transmission gear stage of the transmission 33 to shift up from F3 to F4 is the rotation speed Nc from the speed change mode Map in the map Mup illustrated in FIG. 6. That is Nc<Nv.

(4) Along with the increase in the vehicle speed of the dump truck 10, when the rotation speed at the output portion 33o of the transmission 33 exceeds the rotation speed Nc, the transmission 33 automatically shifts up from F2 to F4.

(5) Since the upshift of the transmission 33 causes the braking force by the engine brake decreases, the vehicle speed of the dump truck 10 increases.

The dump truck 10, which is running down on a slope during automatic driving, repeats (1) through (5), As a result, the transmission 33 repeats an upshift and a downshift. In this embodiment, in a case where an operator is aboard on the dump truck 10, the first control unit 40 is also able to perform automatic control so that the vehicle speed of the dump truck 10 reaches a targeted vehicle speed. In this embodiment, the driving managing device 2 of the AHS 1 automatically drives the dump truck 10 without any operator. However, also in a case where the first control unit. 40 controls the vehicle speed of the dump truck 10 to reach a targeted vehicle speed, there is a possibility that, while the dump truck 10 is running downhill, repetition of upshift and downshift of the transmission 33 may occur.

<Control During Running Downhill>

In this embodiment, in order to reduce a frequency of repetition of the upshift and downshift of the transmission 33 while the dump truck 10, which is provided with the transmission 33 capable of automatically changing speeds in a stared manner, is running downhill, the second control unit 50 provided in the controller 20 controls the dump truck 10 by the following control method. Regarding the second control unit 50, after the transmission 33 shifts down while the dump truck 10 is running downhill, that is, after the first condition is satisfied, the transmission 33 shifts up before lapse of the first predetermined time, in other words, the second condition is satisfied, and then, before the second predetermined time elapses, the transmission 33 shifts down while the dump truck 10 is running downhill. In other words, establishment of the third condition inhibits change in transmission gear ratio of the transmission 33, that is, shift holding is performed. Next, this control method will be more specifically described.

Figure 7:
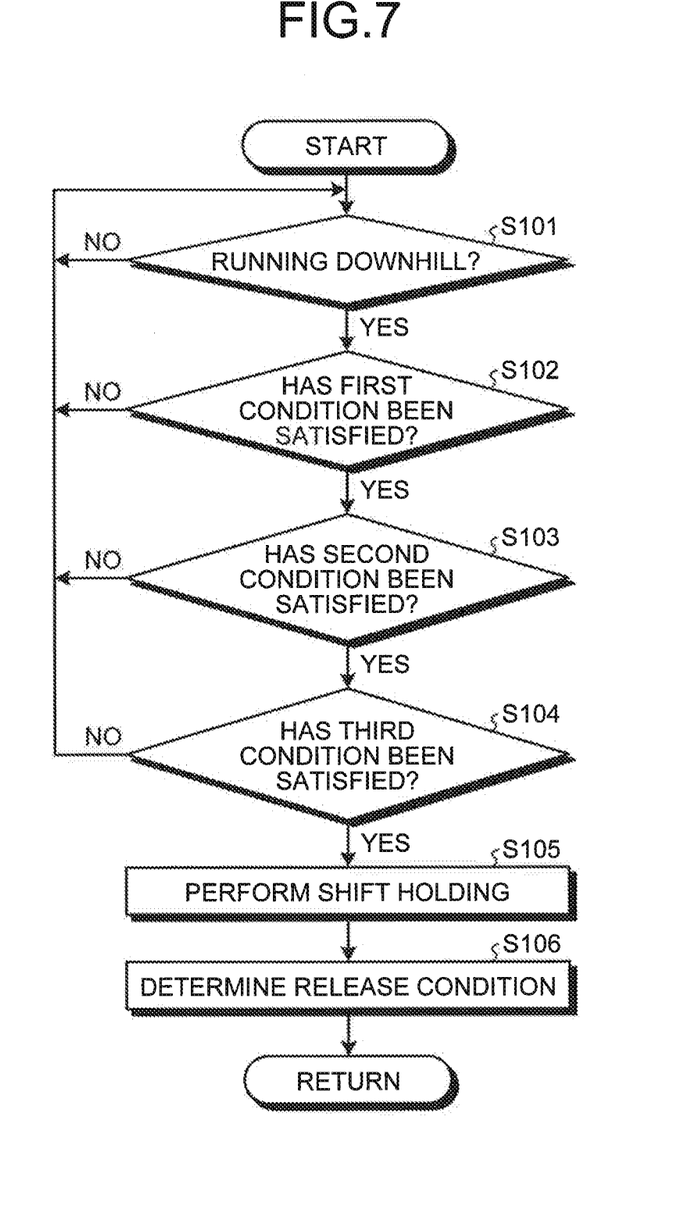
FIG. 7 is a flowchart illustrating one example of a process that executes shift holding in a work vehicle control method according to this embodiment.

FIG. 7 is a flowchart illustrating an example of a process that executes shift holding in a method of controlling the work vehicle according to this embodiment. In the method of controlling the work vehicle according to this embodiment, the running-downhill determining part 51A in the driving control part 51 illustrated in FIG. 4 determines, in step S101, whether or not the dump truck 10 is running downhill. In this embodiment, when the accelerator is closed, the running-downhill determining part 51A determines that the dump truck 10 is running downhill when the vehicle speed of the dump truck 10 in ΔT-T1 after lapse of T1 exceeds a maximum value of the vehicle speed of the dump truck 10 measured at first T1 with ΔT used as one cycle, and an acceleration is greater than 0. The expression, when the accelerator is closed, is a case where the degree of opening of the accelerator is less than a predetermined value, that is, a case where the degree of opening of the accelerator is less than a predetermined opening value. In this embodiment, the predetermined value is, for example, 0.1%. The acceleration may be found from at least two vehicle speeds actually measured at different times and a time interval in which the vehicle speeds were actually measured.

In a case where the dump truck 10 is running downhill (step S101, Yes), the driving control part 51 proceeds to step S102. In a case where the dump truck 10 is not running downhill (step S101, No), the driving control part 51 returns to step S101.

In step S102, the first condition determining part 51B determines whether or not the first condition has been satisfied. The first condition is that the transmission 33 shifted down while the dump truck 10 was running downhill. Therefore, when detecting the downshift of the transmission 33 in step S102, the first condition determining part 51B determines that the first condition has been satisfied (step S102, Yes). In this embodiment, the downshift of the transmission 33 occurs due to braking by the brakes 13B, as described below. Accordingly, the fact that the dump truck 10 was braked such that the brakes 13B of the dump truck 10 operated may be added to the first condition. Also, the fact that the degree of opening of the accelerator is less than the predetermined value may be added to the first condition.

When the first condition has been satisfied (step S102, Yes), the driving control part 51 proceeds to step S103. When the first condition has not been satisfied (step S102, No), the driving control part 51 returns to step S101.

In step S103, the second condition determining part 51C of the driving control part 51 determines whether or not the second condition has been satisfied. The second condition is that, after the first condition has been satisfied, before lapse of the first predetermined time, the transmission 33 shifted up. Therefore, in step S103, when detecting the upshift of the transmission 33 before lapse of the first predetermined time, the second condition determining part 51C determines that the second condition has been satisfied (step S103, Yes). The first predetermined time is not particularly limited, but is preferably approximately 20 seconds to 40 seconds. In this embodiment, the first predetermined time is, for example, 30 seconds.

When the second condition has been satisfied (step S103, Yes), the driving control part 51 proceeds to step S104. In a case where the second condition has not been satisfied (step S103, No), the driving control part 51 returns to step S101.

In step S104, the third condition determining part 51D determines whether or not the third condition has been satisfied. The third condition is that, after the second condition has been satisfied, before the second predetermined time elapses, the transmission 33 shifted down while the dump truck 10 was running downhill. Therefore, in step S104, when detecting the downshift the transmission 33 before lapse of the second predetermined time, the third condition determining part 51D determines that the third condition has been satisfied (step S104, Yes). Also, the fact that the brakes 13B of the dump truck 10 operated to brake the dump truck 10 may be added to the third condition. Moreover, the fact that the degree of opening of the accelerator was less than the above-described predetermined value may be added to the third condition. The second predetermined time is not particularly limited, but is preferably approximately 20 seconds to 40 seconds. In this embodiment, the second predetermined time is set to, for example, 30 seconds, which is equal to the first predetermined time. The first predetermined time and the second predetermined time may differ from each other. Whether or not the dump truck 10 is running downhill is determined by the running-downhill determining part. 51A in the above-described method.

When the third condition has been satisfied (step S104, Yes), the driving control part 51 proceeds to step S105. In a case where the third condition has not been satisfied (Step S104, No), the driving control part 51 returns to step S101. The fact that the process has proceeded through step S105 means that the first condition, the second condition, and the third condition all have been satisfied. In step S105, the speed change control part 51E of the driving control part 51 inhibits change in transmission gear ratio of the transmission 33. In other words, the speed change control part 51E executes shift holding. This causes the transmission gear stage of the transmission 33 to be fixed to the transmission gear stage at the time of processing in step S105. Accordingly, in the transmission 33, an upshift and a downshift are not performed after the shift holding. As a result, the second control unit 50 is able to reduce the frequency of repetition of downshift and upshift of the transmission 33 while the dump truck 10, which is provided with the transmission 33 capable of automatically changing speeds in stages, is running downhill.

The transmission gear stage in step S105 has a transmission gear ratio greater than a transmission gear stage when the dump truck 10 has started to run downhill. Thus, the dump truck 10 is in a state in which the engine brake is applied more than when the dump truck 10 has started to run downhill. In other words, it is preferable that the dump truck 10 be running downhill because the load on the brakes 13B is reduced.

In step S105, before executing the shift holding of the transmission 33, the speed change control part. 51E may execute shift holding after causing the transmission 33 to shift up. This causes the transmission gear stage of the transmission 33 to be fixed to a transmission gear stage having a transmission gear ratio less than that when the third condition has been satisfied. Then, the rotation speed of the engine 31 is reduced so as to be a rotation speed lower than that when the third condition has been satisfied.

After execution of step S105, the driving control part 51 proceeds to step S106. In step S106, the driving control part 51 determines a release condition for the shift holding. Next, a process that determines the release condition will be described.

<Release of Shift Holding>

Figure 8:
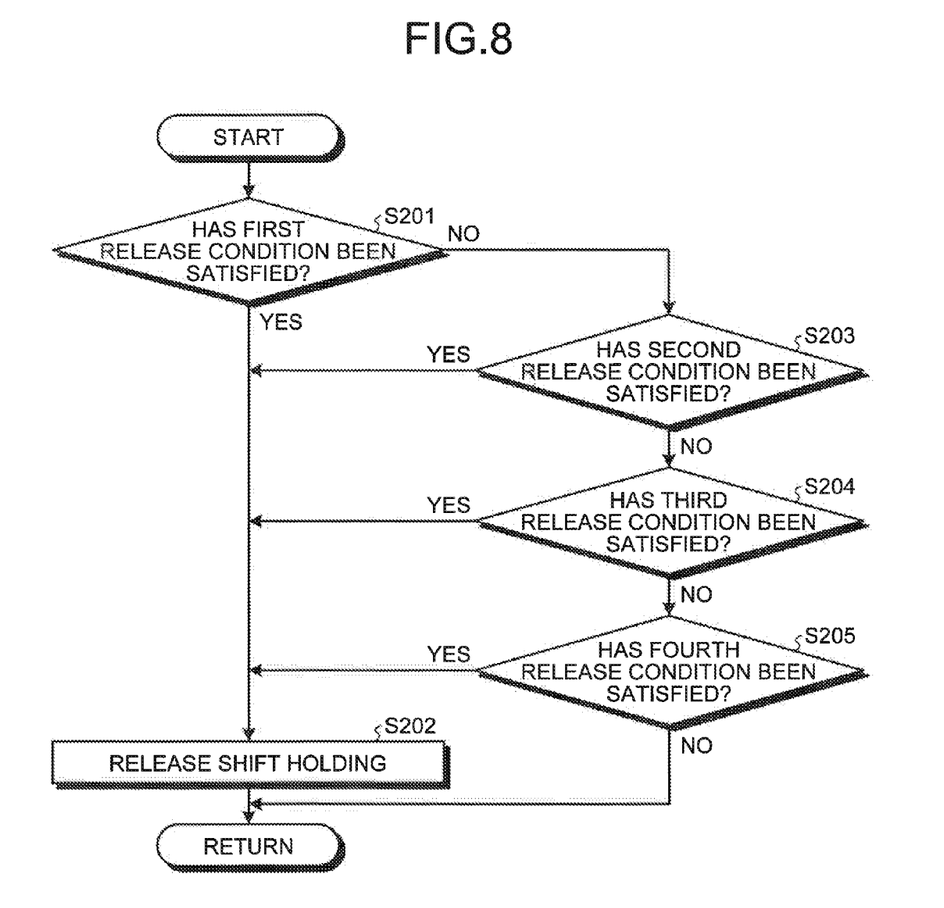
FIG. 8 is a flowchart illustrating one example of a process that cancels shift holding in the work vehicle control method according to this embodiment.

FIG. 8 is a flowchart illustrating an example of a process that releases shift holding in the method of controlling the work vehicle according to this embodiment. In step S201, the release condition determining part 51F of the driving control part 51 determines whether or not a first release condition has been satisfied. The first release condition is that a command value for a vehicle speed (velocity) targeted by the dump truck was changed. The command value for the vehicle speed is transmitted to the second control unit 50 of the dump truck 10 by the driving managing device 2.

The driving control part 51 of the second control unit 50 releases the shift holding in a case where the command value for the vehicle speed has been changed to a predetermined magnitude or greater. In this embodiment, the release condition determining part 51F of the second control unit 50 acquires the command value for the vehicle speed via the communication control device 19 and the communication line 54, and compares the acquired value to a command value for the vehicle speed when shift holding was finally executed while the dump truck 10 was running downhill. In a case where the result of comparison indicates that the vehicle speed acquired when the second release condition was determined differs from the command value for the vehicle speed when the shift holding was executed, the release condition determining part 51F determines that the first release condition has been satisfied (step S201, Yes). The case where both differ is a case where the absolute value of a difference between the command value for the vehicle speed when the shift holding was executed and the command value for the vehicle speed acquired when the second release condition was determined is equal to or greater than a predetermined value. In this case, the release condition determining part 51F determines that the command value for the vehicle speed was changed to a predetermined magnitude or greater. Although the predetermined value is not particularly limited, it is 2 km per hour in this embodiment.

After the first release condition has been satisfied, the driving control part 51 proceeds to step S202. In step S202, the speed change control part 51E releases the shift holding of the transmission 33. The release of the shift holding enables the transmission 33 to change to a transmission gear stage other than a transmission gear stage subjected to shift holding. In a case were the first release condition has not been satisfied (step S201, NO), the driving control part 51 proceeds to step S203.

In step S203, the release condition determining part 51F determines whether or not a second release condition has been satisfied. The second release condition is that, at the time of determining the second release condition, the inclination of a road surface on which the dump truck 10 travels changed by a predetermined value or greater, compared with that when shift holding was executed. The inclination of the road surface is detected by the inclination detecting device 49. The release condition determining part 51F acquires a detection value detected by the inclination detecting device 49 via the communication line 45 of the first control unit 40, the communication line 21 between the first control unit 40 and the second control unit 50, the communication line 54, the communication line 54 of the monitoring part 52 and the second control unit 50.

In this embodiment, in a case where the absolute value of the difference between the inclination of the road surface when the shift holding was executed and the inclination of the road surface when the second release condition was determined is equal to or greater than the predetermined value, the release condition determining part 51F determines that the inclination of the road surface on which the dump truck 10 travels changed by the predetermined value or greater. Although the predetermined value is not particularly limited, it is 3 degrees in this embodiment.

In the case where the inclination, acquired at the time of determining the second release condition, of the road surface on which the dump truck 10 travels, changed by the predetermined value, compared with when the shift holding was executed, the release condition determining part 51F determines that the second release condition has been satisfied (step S203, Yes). After the second release condition has been satisfied, the driving control part 51 proceeds to step. S202. In step S202, the speed change control part 51E releases the shift holding of the transmission 33. In a case where the second release condition has not been satisfied (step S203, No), the driving control part 51 proceeds to step S204.

In step S204, the release condition determining part 51F determines whether or not a third release condition has been satisfied. The third release condition is that, at the time of determining the third release condition, a time in which the degree of opening of the accelerator is greater than a predetermined magnitude continues for a predetermined time. The starting point of the time in which the degree of opening of the accelerator is greater than the predetermined magnitude is a time at which the shift holding of the transmission 33 was executed. The degree of opening of the accelerator is an accelerator control command ACC generated by the driving control part 51.

In this embodiment, the release condition determining part 51F finds a time in which the degree of opening of the accelerator is greater than the predetermined magnitude, with reference to a time at which the shift holding of the transmission 33 was executed. In a case where a state in which the degree of opening of the accelerator is greater than the predetermined magnitude continues for a predetermined time, the release condition determining part 51F determines that the third release condition has been satisfied (step S204, Yes). Although the predetermined time and the predetermined magnitude described above, are not particularly limited, the former is 1 second and the latter is 60% in this embodiment.

After the third release condition has been satisfied, the driving control part 51 proceeds to step S202. In step S202, the speed change control part 51E releases the shift holding of the transmission 33. In a case where the third release condition has not been satisfied (step S204, No), the driving control part 51 proceeds to step S205.

In step S205, the release condition determining part 51F determines whether or not a fourth release condition has been satisfied. The fourth release condition is that, at the time of determining the fourth release condition, the rotation speed of the engine 31 increases than a predetermined magnitude. In this embodiment, the release condition determining part 51F acquires the rotation speed of the engine 31, retained by the engine control part 43 of the first control unit 40, via the communication line 45 of the first control unit 40, the communication line 21 between the first control unit 40 and the second control unit 50, the communication line 54 of the monitoring part 52 and the second control unit 50.

In a case where the rotation speed of the engine 31 is greater than a predetermined magnitude, the release condition determining part 51F determines that the fourth release condition has been satisfied (step S205, Yes). The above-described predetermined magnitude is not particularly limited. After the fourth release condition has not been satisfied, the driving control part 51 proceeds to step S202. In step S202, the speed change control part 51E releases the shift holding of the transmission 33. In a case where the fourth release condition has not been satisfied (step S205, No), the driving control part 51 returns to step S201 and sequentially executes the process from step S201.

As described above, in this embodiment, in a case where the shift holding of the transmission 33 is executed while the dump truck 10 is running downhill, in a case where the release condition determining part 51F has determined that any one of the first release condition, the second release condition, the third release condition, or the fourth release condition has been satisfied, the speed change control part 51E releases the shift holding. This enables the second control unit 50 to drive the dump truck 10 by selecting an appropriate transmission gear stage in a case where there is a change in driving condition of the dump truck 10 or the state of the road surface while the dump truck 10 is running downhill.

Although the foregoing has described this embodiment, this embodiment is not limited on the above-described contents. In addition, the above-described constituent elements include those that can easily be conceived by persons skilled in the art, those that are substantially identical to the elements, or so-called those in the range of equivalence. Further, the above-described constituent elements can be combined if necessary. Moreover, the constituent elements may variously be omitted, replaced, or altered without departing the gist of this embodiment.

REFERENCE SIGNS LIST

1 AHS
2 driving managing device
10 dumb truck
11 vehicle body
12 vessel
13 wheels
13B brakes
14 suspension cylinders
15 rotation sensors
16 suspension pressure sensors
19 communication control device
20 control device
30 driving device
31 engine
32 torque converter
33 transmission
33i input portion
33o output portion
40 first control unit
41 TM control part
42 brake control part
43 engine control part
44 ABS control part
47 brake sensor
48 accelerator position detecting sensor
49 inclination detecting device
50 second control device 51 driving control part
51A running-downhill determining part
51B first condition determining part
51C second condition determining part
51D third condition determining part
51E speed change control part
51F release condition determining part
52 monitoring part
53 safety control part

The invention claimed is:

1. A work vehicle including a transmission that transmits power of an engine to wheels at a plurality of different transmission gear ratios, the work vehicle traveling while maintaining a targeted speed by controlling a degree of opening of an accelerator, brakes, and the transmission,
wherein the work vehicle includes a controller which inhibits change in the transmission gear ratio of the transmission when the transmission shifts up before lapse of a first predetermined time after the transmission shifts down while the vehicle is running downhill and then before a second predetermined time elapses, the transmission shifts down while the vehicle is running downhill.

2. The work vehicle according to claim 1, wherein the controller determines that the vehicle is running downhill when the controller detects that in a case where the degree of opening of the accelerator is less than a predetermined degree of opening, an acceleration of the vehicle is greater than 0 and a speed of the vehicle after lapse of a predetermined time exceeds a maximum value in the predetermined time.

3. The work vehicle according to claim 1, wherein the controller inhibits the change in the transmission gear ratio of the transmission when the transmission shifts up before lapse of the first predetermined time after the transmission shifts down in a state in which the brakes are operated while the vehicle is running downhill and then before the second predetermined time elapses, the transmission shifts down in a state in which the brakes are operated while the vehicle is running downhill.

4. The work vehicle according to claim 1, wherein the controller inhibits the change in the transmission gear ratio of the transmission when the transmission shifts up before lapse of the first predetermined time after the transmission shifts down in a state in which the degree of opening of the accelerator is less than a predetermined degree of opening while the vehicle is running downhill and then before the second predetermined time elapses, the transmission shifts down in a state in which the degree of opening of the accelerator is less than the predetermined degree of opening while the vehicle is running downhill.

5. The work vehicle according to claim 1, wherein the controller cancels the inhibition of the change in the transmission gear ratio when a command value for a speed targeted by the vehicle is changed to a predetermined magnitude or greater.

6. The work vehicle according to claim 1, further including an inclination detecting device that detects an inclination of a road surface on which the vehicle travels,
wherein, when the inclination changes by a predetermined value or greater, the controller cancels the inhibition of the change in the transmission gear ratio.

7. The work vehicle according to claim 1, wherein, when a time in which the degree of opening of the accelerator is greater than a predetermined magnitude continues for a predetermined time, the controller cancels the inhibition of transmission gear ratio.

8. The work vehicle according to claim 1, wherein, when a rotation speed of the engine increases greater than a predetermined magnitude, the controller cancels the inhibition of transmission gear ratio.

9. A method of controlling a work vehicle
that includes a transmission which transmits power of an engine to wheels at a plurality of different transmission gear ratios and that travels while maintaining a targeted speed by controlling a degree of opening of an accelerator, brakes, and the transmission, the method comprising:
determining whether or not a first condition is satisfied, the first condition being that the transmission shifts down while the vehicle is running downhill;
determining whether or not a second condition is satisfied, the second condition being that after the first condition is satisfied, the transmission shifts up before lapse of a first predetermined condition;
determining whether or not a third condition is satisfied, the third condition being that after the second condition is satisfied before lapse of a second predetermined time, the transmission shifts down while the vehicle is running downhill; and
inhibiting change in the transmission gear ratio of the transmission, when all of the first condition, the second condition, and the third condition are satisfied.

10. The method of controlling a work vehicle according to claim 9, wherein the vehicle is determined to be running downhill when in a case where the degree of opening of the accelerator is less than a predetermined degree of opening, an acceleration of the vehicle is greater than 0 and a speed of the vehicle after lapse of a predetermined time exceeds a maximum value in the predetermined time.

11. The method of controlling a work vehicle according to claim 9, wherein operation of the brakes is added to the first condition and to the third condition.

12. The method of controlling a work vehicle according to claim 9, wherein the fact that the degree of opening of the accelerator is less than a predetermined degree of opening; is added to the first condition and to the third condition.

13. The method of controlling a work vehicle according to claim 9, further including providing an inclination detecting device that detects an inclination of a road surface on which the vehicle travels,
wherein when the inclination changes by a predetermined value or greater, the inhibition of the change in the transmission gear ratio is canceled.

14. The method of controlling a work vehicle according to claim 9, wherein when a command value for a speed targeted by the vehicle is changed to a predetermined magnitude or greater, the inhibition of the change in the transmission gear ratio is canceled.

15. The method of controlling a work vehicle according to claim 9, wherein when a time in which the degree of opening of the accelerator is greater than a predetermined magnitude continues for a predetermined time, the inhibition of the change in the transmission gear ratio is canceled.

16. The method of controlling a work vehicle according to claim 9, wherein when a rotation speed of the engine increases by a predetermined magnitude or greater, the inhibition of the change in the transmission gear ratio is canceled.

* * * * *